Aug. 11, 1970  W. L. PERRINE  3,523,453
APPARATUS FOR GENERATING SQUARE ROOTS, AND SQUARE ROOT INTEGRATOR
Filed Oct. 23, 1967  4 Sheets-Sheet 1

INVENTOR.
WARREN L. PERRINE
BY Jennings & Carr
ATTORNEYS.

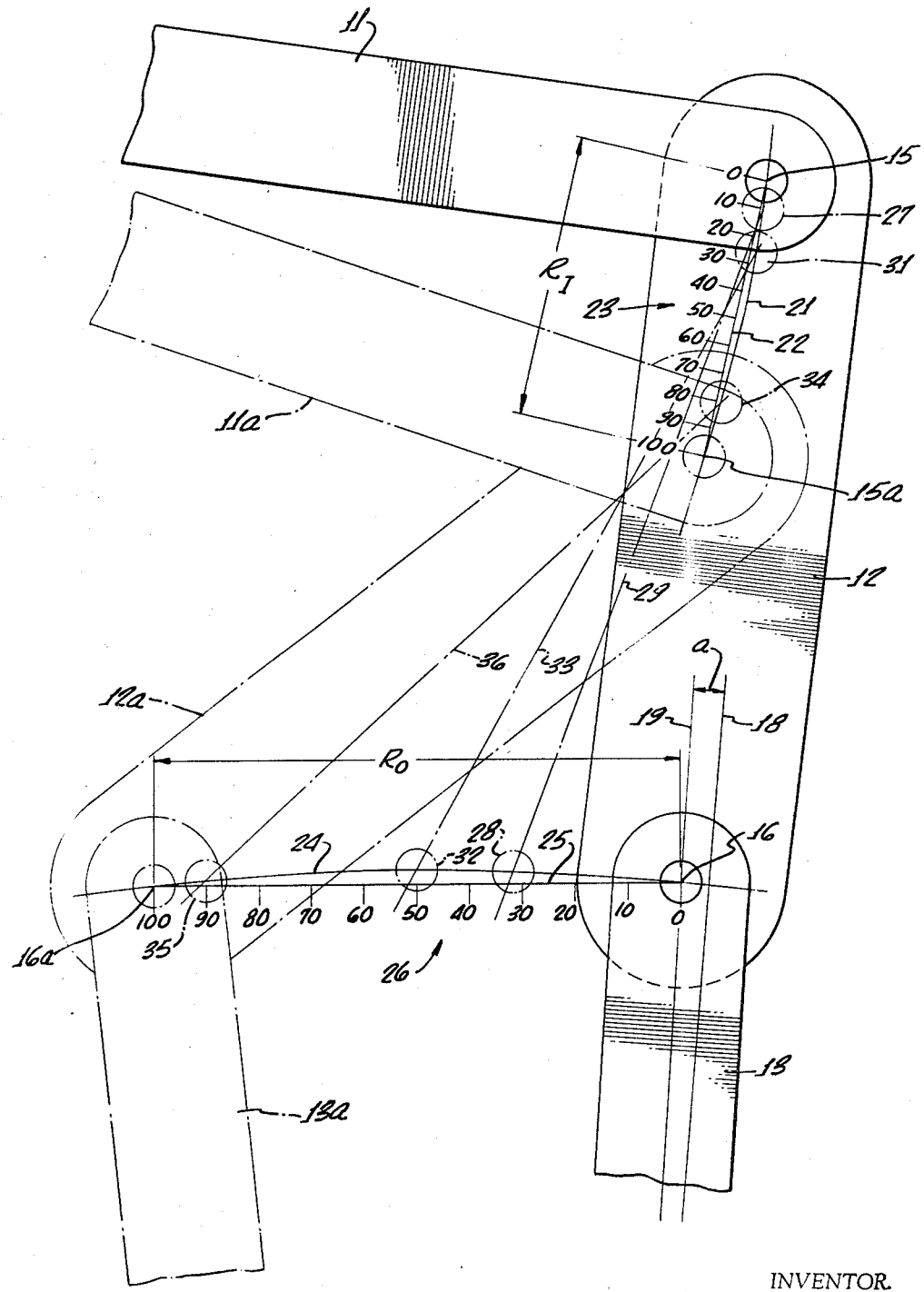

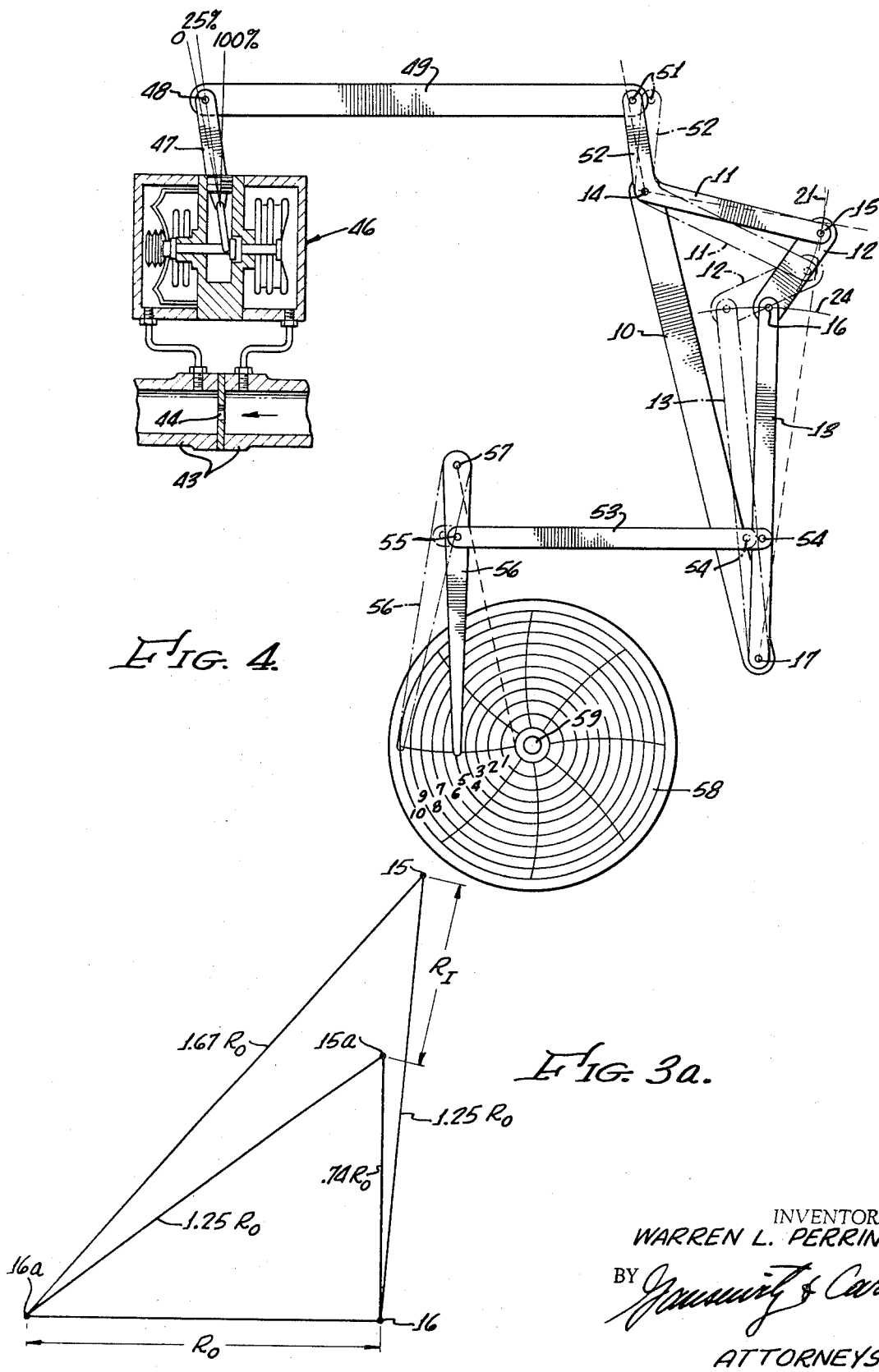

United States Patent Office 3,523,453
Patented Aug. 11, 1970

3,523,453
APPARATUS FOR GENERATING SQUARE ROOTS, AND SQUARE ROOT INTEGRATOR
Warren L. Perrine, 900 Sea Lane, Apt. 5,
Corona del Mar, Calif. 92625
Filed Oct. 23, 1967, Ser. No. 677,243
Int. Cl. G01f 1/00
U.S. Cl. 73—205                                    11 Claims

ABSTRACT OF THE DISCLOSURE

A four-bar linkage which generates, over a predetermined range of operation, a square root function. The disclosure further relates to a method of employing the linkage to generate a square root function, and to an integrator which incorporates the linkage.

BACKGROUND OF THE INVENTION

Field of the invention

The invention relates to the field of mechanical devices for generating square root functions. The invention further relates to the field of mechanical integrators adapted to determine the rates of flow of fluids through conduits.

Description of the prior art

In my prior art Pats. Nos. 2,873,911 and No. 2,968,945, there is described a mechanical integrator whereby the angular speed of a disc may be made to approximate a square root function. Referring to FIG. 9 of Pat No. 2,873,911, a true square root curve is shown at 222 and an approximate square root curve (generated by the apparatus) is shown at 224. The error between the two curves is indicated as being less than 5%, and it is stated that the error may be compensated for to make the maximum error on the order of 0.1%. However, because of factors including difficulty of adjustment, and the extreme difficulty of achieving such compensation, the device of Pat. 2,873,911 has never been commercially utilized to any great extent.

In my prior Pat. 2,956,439, there is described and claimed a mechanical integrator device which is practical and has been marketed successfully, but is incapable of generating a square root function. Accordingly, the device of Pat. 2,956,439 has not been employed in various large market areas including apparatus for determining rates of flow, it being pointed out that (as described in Pat. 2,873,911) flow rate is proportional to the square root of the pressure drop across an orifice.

SUMMARY OF THE INVENTION

I have now discovered a method and apparatus whereby a simple mechanical device, preferably a four-bar linkage, will generate a function which approximates a square root function to a surprisingly high degree of accuracy. No "compensation" of the type required by my prior Pat. 2,873,911 is required. I have also discovered that the four-bar linkage which generates the square root function may be incorporated in a commercially practical and satisfactory mechanical integrator, of the general type described in Pat. 2,956,439, to thereby produce a commercially producible square root integrator device. Very importantly, one of the links of the square root linkage replaces one of the critical links described the Pat. 2,956,439.

BRIEF DESCRIPTION OF THE DRAWINGS

FIG. 3 is a greatly enlarged fragmentary plan view of the upper-right portion of the linkage of FIG. 1, the links being shown in solid lines in one extreme position and in phantom lines in the other extreme position, scale means being provided to indicate the square root relationship;

FIG. 3a is a line diagram showing some fo the critical relationships which are involved;

FIG. 4 shows in a schematic form a device incorporating the square root linkage and which creates on a chart a pen trace having a linear correlation to the flow of fluid through a pipe.

DESCRIPTION OF THE PREFERRED EMBODIMENTS

Throughout this specification and claims, the use of the word "bar" is not intended to be a limitation relative to the shape of any link, but instead is a convenient manner of expression. A bar or link may be, and frequently is, not elongated and straight but instead shaped in any manner whatsoever. Furthermore, a bar or link may be, and frequently is, a portion of a housing or the like. What counts is not the shape of the bar but instead the distance between and location of the various pivot points. For purposes of convenience, and not as any limitation, the "bars" referred to in this application are assumed to be straight.

Throughout the specification and claims, the different positions (other than the initial or starting position) will be expressed not in terms of angles but instead in terms of projections of the critical pivot points along chords. The chord in each case extends between the pivot point at one end of the range of operation, and the same pivot point after shifting thereof to the other end of the range of operation.

Throughout this specification, the scales and square roots are expressed in terms of percentages. Thus, for example, the square root of 25% is 50%.

In order to simplify the present drawings and disclosure, the pivotal connections in the present application are shown and described to be mere pins. It is to be understood, however, that in actual devices the pivotal connections are frequently extremely low-friction connections such as the ball connections, described in the above-cited patents. In each place in the present specification where the location of a pin is referred to, reference is actually being made to the location of the central axis of such pin or of a ball joint, etc.

Ball joints are desirable and even necessary in many devices incorporating the present invention, not only because of friction but in order that the system will have a certain amount of flexibility. One such device is that of FIG. 5.

Figure 1:
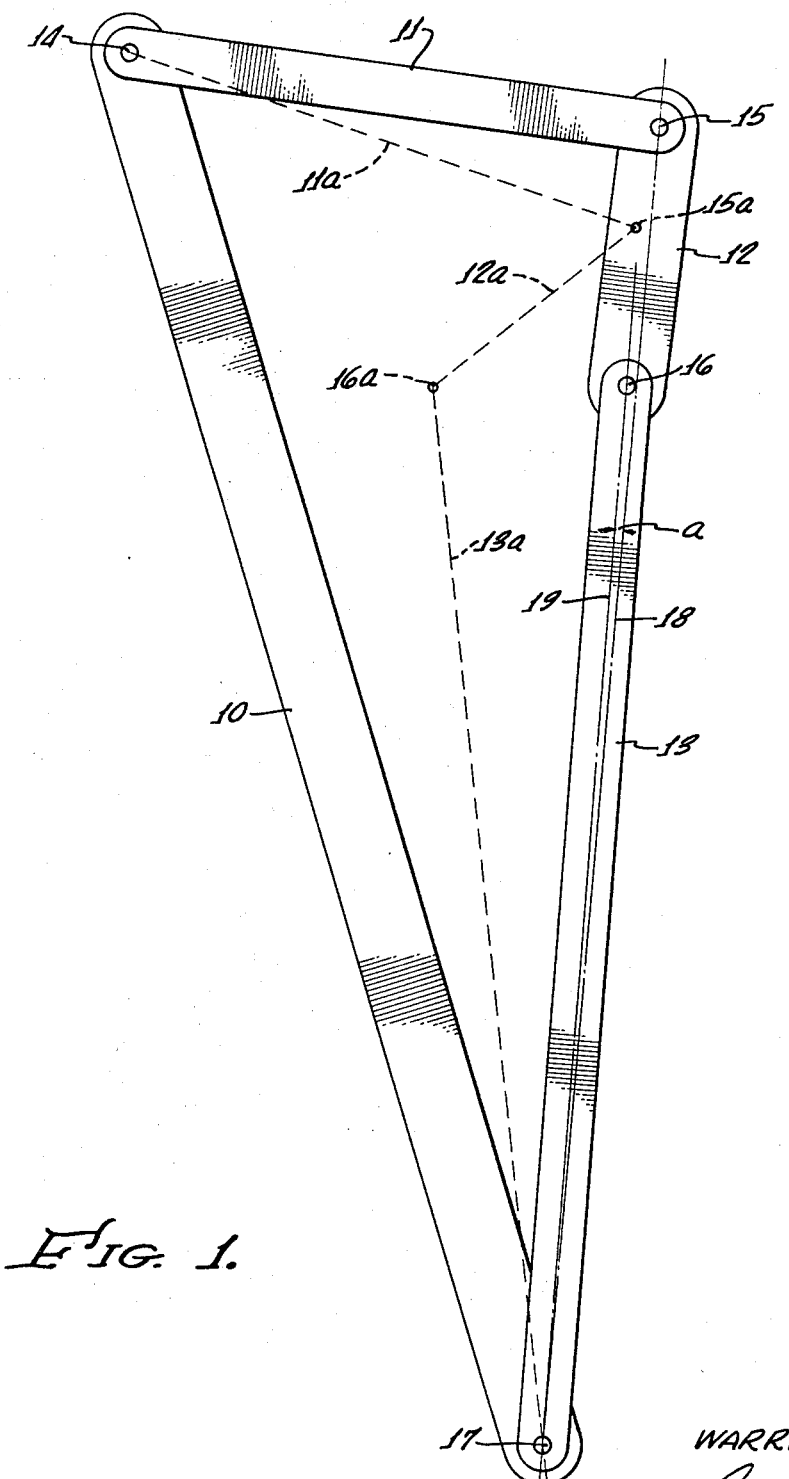
FIG. 1 is a plan view of a four-bar linkage which will generate, over a predetermined range of operation, a square root function.

Referring to FIG. 1, a four-bar linkage is illustrated to comprise bars 10, 11, 12 and 13. Bars 10 and 11 are pivotally connected to each other by means of a pin 14, whereas bars 11 and 12 are pivotally connected to each other by means of a pin 15. Correspondingly, bars 12 and 13 are pivotally connected to each other by means of a pin 16, whereas bars 13 and 10 are pivotally connected to each other by means of a pin 17. The linkage is seen to be a single closed loop.

The axes of all of the "pins" 14–17 are substantially parallel to each other, and all bars 10–13 lie generally in a single plane, but it is pointed out that a certain range of movement out of such plane (for example, as permitted by ball joints) is permissible and sometimes necessary. The use of the phrase "common plane," in the present specification and claims, also includes substantially parallel planes, since the various links may be at different levels.

Figure 5:
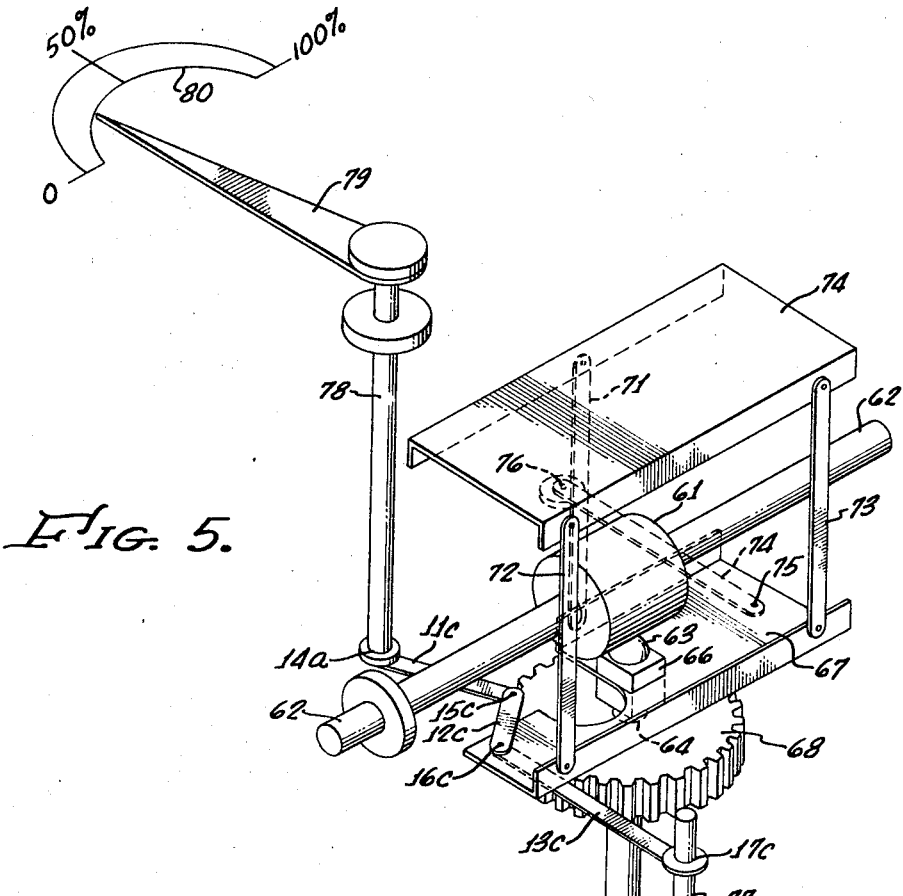
FIG. 5 is an isometric view schematically representing a mechanical square root integrator incorporating the present linkage.

Bar 10 may, for convenience, be termed the "base" since it is frequently formed by a housing, for example in the integrator device of FIG. 5. Bar 11 is denoted the input bar, whereas its associated pin 15 is denoted the input pin (or pivot). Bar 13 is the output bar, whereas its associated pin 16 (or pivot) is the output pin. Bar 12, which extends between pins 15 and 16, is the intermediate bar between input and output. It is to be noted that the input and output pivots are at opposite ends of the same bar (number 12).

A straight line between pins 15 and 17 is indicated in FIG. 1 (and fragmentarily in FIG. 3) at 18. A straight line between pins 16 and 17 is indicated in FIG. 1 (and fragmentarily in FIG. 3) at 19. The angle between lines 18 and 19, which intercept at pin 17, is denoted "$a$."

In FIGS. 1 and 3, the bars are shown in solid lines in the original positions representing the zero points on the scales to be described in connection with FIG. 3. In FIG. 1, the dashed lines 11$a$, 12$a$ and 13$a$ illustrate the positions of the bars 11–13 after they have shifted to positions representing full scale (100%). These same full-scale positions are indicated in FIG. 3 in phantom lines at 11$a$, 12$a$ and 13$a$.

When shifting from zero to full-scale positions, the pins 15 and 16 move (respectively) to the points indicated at 15$a$ and 16$a$. The distance through which pin 15 moves, when traveling to the position indicated at 15$a$, and projected on a chord which extends between the points 15 and 15$a$, is the range of input and is denoted at $R_I$ in FIG. 3. The corresponding output range is denoted at $R_O$ therein, being the chordal projection of the movement of output pivot 16.

Referring particularly to FIG. 3, the arc through which pin 15 moves, when traveling from its zero position to the "100%" position indicated at 15$a$, is represented by the arcuate line 21 (the center of which is at 14). The chord of such arc is numbered 22. A scale 23 is shown in FIG. 3 as being marked or located adjacent chord 22. Such scale 23 is illustrated as being divided into ten sections which represent the percent of the range $R_I$ along chord 22.

In like manner, the arc through which pin 16 travels when moving from zero position to full-scale position 16$a$ is represented at 24 in FIG. 3, the center of such arc being at 17. The chord of arc 24 is numbered 25, having a scale 26 adjacent thereto. Scale 26 is shown as being divided into ten sections which represent the percent of full scale along chord 25.

Scale 23 is the "input" scale since it indicates the movement of input pivot pin 15, whereas scale 26 is the "output" scale since it indicates the movement of output pivot pin 16.

DESCRIPTION OF VARIOUS IMPORTANT FACTORS AND RELATIONSHIPS, AND OF THE METHOD

It is one of the major contributions of the present invention that a simple mechanical device, preferably a four-bar linkage, may be made to generate a square root function to a surprising degree of accuracy, and over a very wide range.

One of the bars in the four-bar linkage is relatively long, being numbered 10 in the drawings. Another of the bars (numbered 12 in the drawings) has an input pin at one end thereof and an output pin at the other end thereof, such other bar (number 12) not being directly connected to the relatively long bar 10. Stated otherwise, the bar 12 having the input and output pivots at opposite ends thereof is an intermediate bar which is only connected to the relatively long bar 10 through the input and output bars 11 and 13.

The direction of motion of the input pin 15 is transverse to the direction of motion of the output pin 16. More specifically, such directions of motion approach the perpendicular relative to each other.

When the linkage is in its zero position, shown full-line in FIGS. 1 and 3, the three pivots 15, 16 and 17 are in substantial alignment with each other, pivot 16 being between 15 and 17. Thus, and as will be described below angle "$a$" is very small and is preferably substantially zero degrees. In moving from zero to full-scale position, output pivot 16 shifts toward the bar 10.

Another major contribution of the present invention is that a four-bar linkage having certain bar lengths, a certain operating range and a certain initial angle "$a$" will generate a square root function to an extremely high degree of accuracy over substantially 100% of full scale. The error is less than plus or minus 0.1% of full range output, over the entire input range except where zero position is closely approached (the error then becoming somewhat greater).

One set of critical relationships required to produce the specified precise square root function is as follows: Assuming that the length of bar 10 is one unit, the length of bar 11 is about 0.357, the length of bar 12 is about 0.178, the length of bar 13 is about 0.732, the length of the input range $R_I$ (FIG. 3) is about 0.074, and the length of output range $R_O$ is about 0.143. As stated heretofore, reference to the length of any bar 10–13 actually denotes the straight line distance between the axes of the pivots at the ends of the bars. The length $R_I$ is taken along the chord 22, whereas that of $R_O$ is taken along chord 25.

Some of the bar lengths may be changed, and still achieve the desired square root generation, so long as the ranges $R_I$ and $R_O$ remain substantially constant and fixed in space in accordance with the following principles. Referring to FIGS. 3 and 3$a$, a first point (numbered 15) on a bar (numbered 12) moves from a first point (numbered 15) in a plane to a second point (numbered 15$a$) therein, thus defining input range $R_I$. A second point (numbered 16) on such bar 12 moves from a third point (numbered 16) in such plane to a fourth point (numbered 16$a$) therein, thus defining output range $R_O$.

Both of points 15 and 15$a$ lie on the same side of a line through points 16 and 16$a$. Assuming that the length $R_O$ is one unit, the distance from point 15 to point 16 is about 1.25, that from 15 to 16$a$ is about 1.67, that from 15$a$ to 16 is about 0.74, and that from 15$a$ to 16$a$ is about 1.25, Such relationships may be achieved not only with specific linkage set forth above, but with certain other linkages and other mechanical devices. For example, bar 11 could be much longer than is set forth above, in which event the arc 21 (FIG. 3) would be flatter but the chord 22 would be the same.

The angle "$a$" shown in FIGS. 1 and 3 should be made very small in order to achieve accurate square root generation over a wide range. Stated more definitely, angle "$a$" should be zero or only a few minutes. The angle "$a$" shown in FIGS. 1 and 3 is exaggerated in such figures in order to make it appear clearly.

The method of the present invention comprises providing a four-bar linkage, causing the pivot pin at one end of one of the bars of the linkage to move in accordance with an input, and relating the various bars of the linkage and other factors in such manner that (throughout a predetermined range) the pivot pin at the other end of such one bar will generate a function which represents the square root of the input.

Referring to FIG. 3, it is pointed out that when the input bar 11 has pivoted downwardly until input pivot pin 15 is at the position shown in phantom lines at 27, the output bar 15 has pivoted to the left through a distance such that output pivot pin 16 is in the position shown at 28. A phantom line, numbered 29 and representing bar 12, is drawn between the two corresponding positions 27 and 28 of the respective pins 15 and 16. The axis of pin 15 when in the position shown at 27 is at 10% on the input scale 23. The axis of pin 16 when in the position shown at 28 is then at 31.87% on the output scale 26, 31.87% being the square root of 10%.

Correspondingly when pin 15 is in the position shown at 31, pin 16 is in the position shown at 32, these positions being connected by a line 33 representing bar 12. Position 31 is at 25% on the input scale 23, whereas position 32 is at 50% on the output scale 26, 50% being the square root of 25%. In like manner, when pin 15 is at the position shown at 34, pin 16 is at the position shown at 35, positions 34 and 35 being connected by the line 36 representing bar 12. Position 34 is at 81% on input scale 23, whereas position 35 is at 90% on output scale 26.

The scales 23 and 26 are linear, each mark being separated by the same distance from each adjacent mark on each scale. Accordingly, the square root function is generated by the linkage itself, not by any nonlinearity of the scales 23 and 26.

From the above it will be noted that the initial motion of pin 16 to the left from zero is very rapid in comparison to the initial motion of pivot 15 downwardly from zero.

Figure 2:
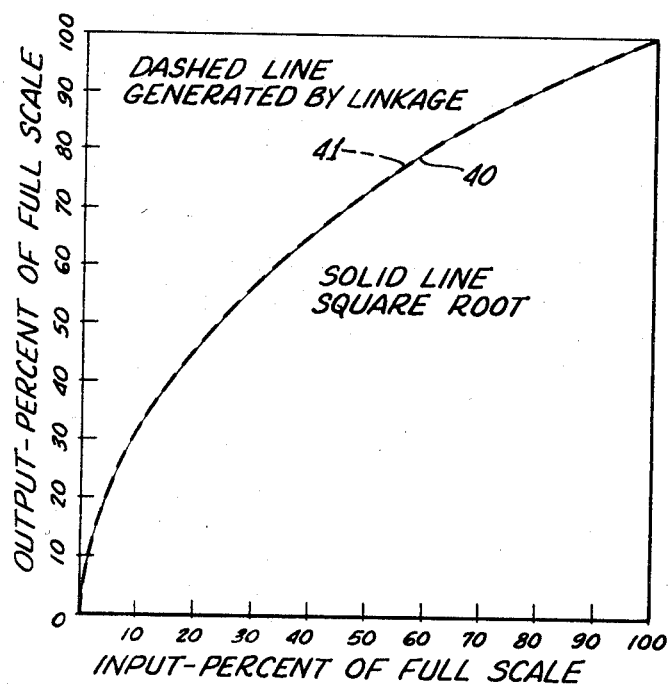
FIG. 2 is a graph illustrating two curves, one representing a true square root and the other representing the square root function generated by the linkage of FIG. 1, the two curves being substantially coincident.

Referring to FIG. 2, the curve shown by a solid line, and numbered 40, is a true mathematically determined square root curve. The curve indicated by a dashed line at 41 is the curve which results from utilization of the present method and apparatus, the lengths of the bars 10–13, the ranges $R_I$ and $R_O$ and the angle "$a$" being as specified heretofore. FIG. 2 may be compared with FIG. 9 of the above-cited Pat. No. 2,873,911.

Means, not shown, may be provided to shift the pivot pins 15, 16 and 17 out of initial alignment relative to each other, in order that input pin 15 will not be locked and can therefore move downwardly in response to downward pressure exerted on input bar 11. Such means may comprise, for example, a suitable spring. It may also comprise an additional link associated with pin 17 and also with a spring and suitable stops, the relationship being such that pivot pin 17 is momentarily shifted out of line with pins 15 and 16 in order to eliminate the "dead center" condition. The additional link, it is emphasized, does not prevent the system from being a four-bar linkage since the additional link only operates during a very short range when pins 15 and 16 are closely adjacent the zero positions on their associated scales.

In some situations, for example when the square root linkage is employed in conjunction with a bellows-type differential pressure flowmeter which does not produce an output exactly conforming to the theoretical square root function, the ranges $R_I$ and $R_O$, and the angle "$a$" may be varied in order that the function may be approximated in the desired manner to thereby compensate for the deviations in the output from the flowmeter. For example, angle "$a$" may be made substantially larger than the few minutes specified above. In addition, in such circumstances and other analogous circumstances, changes in the lengths of the various bars may be permissible. It is to be noted that the bar lengths and other factors may be varied in such a way that the maximum error occurs at a portion of the range which does not normally occur in practice relative to a particular device with which the linkage is employed.

APPARATUS OF FIG. 4

Referring to FIG. 4, the linkage of the invention is illustrated as employed in conjunction with a pipe 43 having an orifice 44 therein, the pressure drop across orifice 44 due to flow of fluid therethrough being determined by a device such as the bellows-type differential pressure flowmeter indicated at 46. Meter 46 will not be described in detail since it is well known in the art and may correspond to the one described relative to FIG. 1 of the above-cited Pat. 2,873,911.

The velocity of the liquid or gas within pipe 43 conforms to the square of the differential pressure across orifice 44 as measured by the displacement of the bellows and the corresponding motion of the bellows output arm 47. For example, if the velocity of the liquid or gas is 50% of the full scale velocity (100%), then the bellows displacement will be the square of 50%, namely 25%.

The bellows output arm 47 is pivotally connected at 48 to a link 49, the latter being in turn pivotally connected at 51 to a bell-crank portion 52 formed integrally with the above-described input bar 11.

Another link 53 is pivoted at 54 to a suitable intermediate point on output bar 13 and also (at 55) to a pen recorder element 56, the latter being pivoted at 57 to a fixed support (not shown). The circular chart of the pen recorder device is indicated at 58 and is suitable rotated at constant speed about the central axis 59. Such chart is provided with concentric circles numbered 1 through 10, inclusive. Bar 10 is mounted fixedly to a suitable fixed support, not shown.

As noted above, if the velocity of the liquid or gas in pipe 43 is (for example) 50% of full scale velocity (100%), then the bellows displacement will be the square of 50% or 25%. This displacement is indicated in solid lines in FIG. 4. Such 25% relationship is supplied through bar 49 and bell-crank portion 52 to input bar 11, so that the square root is read out from output bar 13 by bar 53 and transmitted to the pen recorder element 56. The result is that the pen trace bears a linear correlation to the flow of liquid or gas in pipe 43, as desired. In the present illustration, wherein 25% is indicated in solid lines relative to arm 47, the pen trace of chart 58 (the pen being also indicated in solid lines) is at 50% of full scale.

It is to be understood that the points where bars 49 and 53, etc., are connected and correlated to each other and to the chart 58 in such manner that the desired relationship will be achieved. The important factors is that the meter device 46 generates the square function, and that the linkage of the present invention takes the square root and transmits the square root function to the pen recorder chart 58. The rate or volume of flow of liquid or gas in the pipe 43 is therefore recorded on the chart 58.

In calibrating the device of FIG. 4, and locating the various pivot points 48, 51, 54 and 55, a micrometer (or the like) is applied to link 12 at input pivot 15. The axis of the micrometer is aligned with input chord 22 (FIG. 3). The micrometer is then operated to supply various inputs, and such inputs are correlated to the position of arm 47 and to the locations of the various rings on chart 58. Because of the pivotal relationships which are present, the radial distances between adjacent rings on chart 58 are not necessarily constant.

SQUARE ROOT INTEGRATOR, FIG. 5

Referring next to FIG. 5, a square root integrator device is schematically represented, being of the general ball-and-cylinder type described in detail in the above-cited Pat. No. 2,956,439.

The cylinder of the integrator is numbered 61 and corresponds to the sleeve or roller which is numbered 94 in the Pat. 2,956,439. Cylinder 61 is fixedly mounted on a shaft 62 which is suitably journaled as in the casing or housing (not shown) of the integrator. Shaft 62 corresponds to the shaft which is numbered 90 in the Pat. 2,956,439.

The cylindrical outer surface of element 61 is contacted by the upper one of a pair of balls 63 and 64 which are mounted in a ball bushing 66, the latter being in turn mounted in a ball carriage 67 which is illustrated to comprise a horizontal plate. Balls 63 and 64 of the present application may correspond to balls 88 and 87, respectively, shown in FIG. 2 of Pat. 2,956,439. The ball bushing 66 and ball carriage 67 of the present application may correspond, respectively, to bushing 85 and carriage 50 described in the Pat. 2,956,439.

The lower one 64 of the balls is contacted and driven by the horizontal upper surface of a disc or platform 68 which may correspond to element 40 of the Pat. 2,956,439. Since element 68 is normally driven by a gear, not shown, it is illustrated to comprise a gear. However, in the present schematic illustration, the shaft 69 of disc 68 is shown as being driven by a motor 70, such driving normally being at constant speed in order that the rotation of the disc 68 will represent time. Shaft 69 is suitably journaled in the housing, not shown, of the apparatus and therefore is fixed in position relative to shaft 62.

The ball carriage 67 is suspended by three corresponding hanger links 71–73 from a support element 74 which is fixed in position and may form part of, or be fixedly connected to, the unshown housing of the apparatus. The pivotal mountings of links 71–73 are such that the ball carriage 67 may shift in directions generally parallel to the axis of cylinder 61, and radially of the upper surface of disc 68. Accordingly, the lower ball 64 will engage the upper surface of disc 68 at different radial distances from the axis of such disc 68, thereby changing the rate at which the balls 64 and 63 will be rotated by disc 68 and, accordingly, the rate at which the cylinder 61 and its shaft 62 will be driven by disc 68.

The hanger links 71–73 may correspond to the links 53–55 described and shown in Pat. 2,956,439.

The Pat. 2,956,439 also shows and describes two additional and highly important links, which are termed swing arms 60 and 70 in such patent. One of such links or arms is present in the present integrator, being numbered 74. Link or arm 74 is pivoted at 75 to ball carriage 67, being also pivoted at 76 to the housing (not shown) of the apparatus.

It is a highly important feature of this invention that the remaining swing arm or link described in the Pat. 2,956,439 is omitted and replaced by the output bar 13c of the present square root generator. Thus, output bar 13c (which corresponds to bar 13 described in detail above) is pivotally connected at 16c to ball carriage 67 and at 17c to a pin 77 which is mounted to the housing (not shown) of the apparatus. As stated above, pivots 16c, 17c, 75, 76, etc., are actually ball joints.

Accordingly, the elements 13c and 74 perform the functions of the swing arm or links described in the Pat. 2,956,439, and also Pat. 2,873,911, whereas the element 13c additionally performs the critically important function of the output bar of the present square root generator.

Elements 13c and 74 lie generally in a common plane which is parallel to the axis of shaft 52, and is also generally parallel to the upper surface of disc 68. The hanger links 71–73 are generally perpendicular to such common plane. Pivots 16c and 75 lie along a straight line which intersects a vertical line containing the common axis of both balls 63 and 64. Such ball axis is located midway between pivots 16c and 75. As indicated above, the ball axis moves along a radius of disc 68. The links or bars 13c and 74 correspond to each other and are equal in length. They extend in opposite directions from ball carriage 67.

The above-cited patents are incorporated by reference herein, as if set forth in full, and supply further descriptions of the swing links, hanger links, housing, etc. The housing (generally unshown in FIG. 5) is a unitary "fixed support."

As described in detail relative to previous embodiments, the intermediate bar 12c of the present apparatus for generating a square root function is also pivotally connected to pivot 16c and, furthermore, is pivotally connected at 15c to the input bar 11c of the linkage. In the present embodiment, bar 11c is schematically represented to comprise a crank on a shaft 78 which is journaled in the unshown housing of the apparatus. Shaft 78 is substantially perpendicular to the common plane containing elements 13c and 74.

The axis of shaft 78 is at 14a, so that all of the bars 11c, 12c and 13c of the square root linkage will correspond exactly to the bars described above relative to FIGS. 1 and 3. The remaining bar (numbered 10 in FIG. 1) is not illustrated herein since the housing forms a fixed connection between pin 77 and shaft 78 and therefore serves the purpose of such remaining bar. It is emphasized that a pivot may be provided at 14a in the form of a ball joint, and that shaft 78 may be replaced by another form of input.

Shaft 78, which is the input shaft, may be suitably associated with an input device such as the links or bars 47 and 49 described relative to FIG. 4. In the present schematic illustration, shaft 78 is illustrated as being associated through a pointer 79 with a scale 80, the latter being marked in various percentages ranging from zero to one hundred.

As described in detail above, pivot 16c is the output of the square root linkage. It follows that when shaft 78 (with associated pointer 79) is turned in order to rotate bar 11c to thereby shift input pivot 15c through a distance corresponding to a percentage of input, the output pivot 16c will move through a distance corresponding to the square root of such input. The hanger links 71–73 are so related to the square root linkage that ball carriage 67 will move in a direction generally parallel to chord 25 (FIG. 3) when input 15c moves in a direction parallel to chord 22 (FIG. 3). Stated otherwise, the relationships are such that input pivot 15c moves along arc 21 shown in FIG. 3, whereas output pivot 16c moves along arc 24 shown in FIG. 3. The device is calibrated with a micrometer, as described relative to FIG. 4, so that scale 80 is not necessarily linear.

It is pointed out that the relationship is such that the ball 63 follows a straight path equal in length to the chord of the arc generated by output pivot 16c in moving through its operating range. Correspondingly, input pivot 15c is calibrated in terms of the chord of its arc. Reference is made to FIG. 8 of Pat. 2,873,911.

It follows that the ball carriage 67 will move through a distance corresponding to the square root of the distance through which input pivot 15c moves in response to actuation of shaft 78 and thus of crank 11c. Since the ball carriage 67 moves through a distance corresponding to square root, the balls 64 and 63 also move through such distance and cause the drive between disc 68 and cylinder 61 to be a function of the square root. Accordingly, with the present integrator the rotation of shaft 62, which is the output shaft and is normally connected to an unshown counter device, represents the square root function with respect to the input element 73. This assumes, as stated above, that motor 70 is driving disc 68 at a constant speed.

As an example, if the speed of the roller or cylinder 61 is 100 r.p.m. when pointer 79 is adjacent the 100% position on scale 80, then the revolutions per minute of the output shaft 62 would be 100, 90, 50, 40 and 20 for input positions (relative to pointer 79) of 100, 81, 25, 16 and 4.

The embodiments of FIGS. 4 and 5 may be provided with suitable means, as described above relative to FIGS. 1 and 3, for eliminating the "dead center" relationship between pivots 15c, 16c and 17c when the zero position is closely approached.

It has been found that when the device is very close to zero position, ball 64 is close to but not precisely at of the axis of disc 68. At such times, the drive from motor 70 may be interrupted, as by a suitable clutch mechanism.

It is emphasized that the size of the present mechanical integrator device is very small. For example, the entire housing, not shown, may be a cube having a dimension of approximately one and one-half inches on each side. The forces involved are frequently exceedingly small. Thus, for example, when the device is employed in conjunction with the bellows device 46 shown in FIG. 4, the forces involved are normally only about six inch-grams per percent of full scale deflection. It therefore follows that the amount of friction must be reduced to a very minimum, making it highly important that the number of links and pivot points be minimized. Therefore, the double utilization of the element 13c as a swing link and also as one of the bars of the square root linkage is very important to the successful commercial operation of the present integrator.

In the appended claims, the use of the term "end" in connection with the various "bars" is not to be construed as a limitation, since each bar may (as in FIG. 4, bell crank 52) extend past its associated pins or pivots. This is analogous to the fact that, as described above, a "bar" may be any size or shape and may even be part of the housing (as described relative to FIG. 5). The effective length of any bar is the straight-line distance between the two pivots thereof.

The operation of the present square root generator, FIGS. 1 and 3, may be reversed. Pivot 16 would then be the input, and pivot 15 the output, such output representing the square root of the input.

The expression "chordal projection" is hereby defined to mean the projection of the path of motion of a pivot or pin on the chord of the arc generated by such pin in moving throughout the operating range (for example, the chords 22 and 25, FIG. 3). Use of the expression "chordal projection" in the appended claims is not necessarily to be interpreted as a limitation, since for many bars the error between the distance along the arc, and that along the chord, is slight.

The drawings in the present application are not necessarily completely to scale. Accordingly, the dimensions and relaitonships stated numerically in the specification are to be regarded as predominating over the drawings.

The foregoing detailed description is to be clearly understood as given by way of illustration and example only, the spirit and scope of this invention being limited solely by the appended claims.

I claim:

1. A four-bar linkage apparatus for generating a square root function, which comprises:
   first, second, third and fourth bars,
   a first pivot pivotally connecting said first and second bars,
   a second pivot pivotally connecting said second and third bars,
   a third pivot pivotally connecting said third and fourth bars, and
   a fourth pivot pivotally connecting said fourth and first bars,
      the positions of said pivots being such that said second pivot moves generally toward said fourth pivot in traveling between one end of the operating range of said second pivot and the other end of the operating range thereof,
      the positions of said pivots also being such that when said second pivot moves through said operating range thereof, said third pivot will move through an operating range which is so related to said operating range of said second pivot that, over major portions of said operating ranges, the chordal projection of said third pivot represents the square root of the chordal projection of said second pivot,
      the distance between said first and second pivots being about 35.7% of the distance between said first and fourth pivots,
      the distance between said second and third pivots being about 17.8% of the distance between said first and fourth pivots, and
      the distance between said third and fourth pivots being about 73.2% of the distance between said first and fourth pivots.

2. The invention as claimed in claim 1, in which the positions of said pivots are also such that said third pivot moves toward said first bar in traveling between one end of said operating range of said third pivot and the other end of said operating range thereof.

3. The invention as claimed in claim 2, in which said second, third and fourth pivots are in general alignment with each other when said second and third pivots are at said one ends of said operating ranges thereof.

4. The invention as claimed in claim 1, in which the length of said chordal projection of said second pivot, when said second pivot moves through said operating range thereof, is about 7.4% of the distance between said first and fourth pivots, and in which the length of said chordal projection of said third pivot, when said third pivot moves through said operating range thereof, is about 14.3% of the distance between said first and fourth pivots.

5. The invention as claimed in claim 4, in which the angle defined between a line containing said second and fourth pivots and a line containing said third and fourth pivots, when said third pivot is at one end of said operating range thereof, is no greater than a fraction of one degree.

6. The invention as claimed in claim 5, in which said angle is substantially zero.

7. Apparatus for generating square roots, which comprises:
   a bar, and
   means to effect progressive movement of said bar in generally a single plane to cause one point on said bar to move from a first point substantially in said plane to a second point substantially therein, and to cause another point on said bar to move from a third point substantially in said plane to a fourth point substantially therein,
      the distance from said first point in said plane to said third point therein being about 125% of the distance from said third point in said plane to said fourth point therein,
      the distance from said first point in said plane to said fourth point therein being about 167% of the distance from said third point in said plane to said fourth point therein,
      the distance from said second point in said plane to said third point therein being about 74% of the distance from said third point in said plane to said fourth point therein,
      the distance from said second point in said plane to said fourth point therein being about 125% of the distance from said third point in said plane to said fourth point therein,
      said first and second points both being on the same side of a line through said third and fourth points,
      said distance from said first point in said plane to said second point therein being the input range of the square root generator,
      said distance from said third point in said plane to said fourth point therein being the output range of the square root generator.

8. The invention as claimed in claim 7, in which the distance between said one point on said bar and said other point thereon is about 125% of the distance from said third point in said plane to said fourth point therein.

9. The invention as claimed in claim 7, in which said means effects movement of said one point on said bar along a first arcuate path containing said first and second points, and effects movement of said other point on said bar along a second arcuate path containing said third and fourth points.

10. The invention as claimed in claim 7, in which said bar is one link of a linkage, in which said one point on said bar and said other point thereon are pivot points of said linkage, and in which said means includes the remaining links of said linkage.

11. The invention as claimed in claim 10, in which said linkage is a four-bar linkage.

References Cited

UNITED STATES PATENTS 2,949,037   8/1960   Knuppe   73—205 XR
3,264,870   8/1966   Berger   73—205

RICHARD C. QUEISSER, Primary Examiner

J. K. LUNSFORD, Assistant Examiner

U.S. Cl. X.R.

73—206